United States Patent [19]
Cho

[11] Patent Number: 5,917,716
[45] Date of Patent: Jun. 29, 1999

[54] SWITCHING MODE POWER SUPPLIER HAVING FUNCTION OF PROTECTING CIRCUIT FROM ABNORMAL VOLTAGE

[75] Inventor: Yong-Moon Cho, Kyungki-do, Rep. of Korea

[73] Assignee: SamSung Electronics Co., Ltd., Kyungki-do, Rep. of Korea

[21] Appl. No.: 09/026,407

[22] Filed: Feb. 19, 1998

[30] Foreign Application Priority Data

Feb. 21, 1997 [KR] Rep. of Korea ......................... 97-5239

[51] Int. Cl.⁶ ............................ H02M 3/335; H02H 7/00
[52] U.S. Cl. ................................. 363/21; 361/18
[58] Field of Search .................... 363/20, 21, 50, 363/55, 56, 97, 131; 361/18, 86, 90, 91

[56] References Cited

U.S. PATENT DOCUMENTS

| | | | |
|---|---|---|---|
| 4,130,862 | 12/1978 | Holt | 363/49 |
| 4,236,187 | 11/1980 | Mochizuki et al. | 363/21 |
| 4,858,052 | 8/1989 | McDonnal | 361/18 |
| 4,876,637 | 10/1989 | Mose et al. | 363/37 |
| 4,914,560 | 4/1990 | Oh et al. | 363/56 |
| 4,916,569 | 4/1990 | Konopka | 361/18 |
| 5,029,269 | 7/1991 | Elliot et al. | 363/21 |
| 5,124,906 | 6/1992 | Kang | 363/21 |
| 5,216,585 | 6/1993 | Yasumura | 363/19 |
| 5,227,964 | 7/1993 | Furuhata | 363/56 |
| 5,448,469 | 9/1995 | Rilly et al. | 363/21 |
| 5,465,201 | 11/1995 | Cohen | 363/21 |
| 5,570,277 | 10/1996 | Ito et al. | 363/21 |
| 5,594,631 | 1/1997 | Katoozi et al. | 363/41 |
| 5,621,625 | 4/1997 | Bang | 363/21 |
| 5,633,787 | 5/1997 | Song | 363/21 |
| 5,657,218 | 8/1997 | Rilly et al. | 363/97 |
| 5,784,231 | 7/1998 | Majid et al. | 361/18 |

Primary Examiner—Matthew Nguyen
Attorney, Agent, or Firm—Robert E. Bushnell, Esq.

[57] ABSTRACT

A switching mode power supply which protects against circuit damage when an abnormal state such as the disconnection or short circuit of a load occurs. The switching mode power supply includes a pulse width modulation controller, a switching transistor, a switching transformer having a primary coil, secondary coils, and a tertiary coil, an error detection and feedback part connected to a secondary coil, and an abnormal voltage detecting part connected to the tertiary coil. The pulse width modulation controller controls the on time and off time of the switching transistor in order to control the switching transformer, and to thereby control the supplied power. The pulse width modulation controller receives error information detected by the abnormal voltage detecting part and also error information detected by the error detection and feedback part. The abnormal voltage detecting part includes a zener diode and senses whether a voltage induced at the tertiary side coil of the switching transformer is normal or abnormal. The abnormal voltage detecting part immediately stops a pulse width modulation operation when an abnormal voltage is detected at the tertiary side coil, in order to prevent circuit damage. The error detection and feedback part also detects errors and supplies the pulse width modulation controller with feedback, in order to prevent circuit damage.

20 Claims, 4 Drawing Sheets

1

SWITCHING MODE POWER SUPPLIER HAVING FUNCTION OF PROTECTING CIRCUIT FROM ABNORMAL VOLTAGE

CLAIM OF PRIORITY

This application makes reference to, incorporates the same herein, and claims all benefits accruing under 35 U.S.C. § 119 from an application for Switching Mode Power Supplier Having Function of Protecting Circuit from Abnormal Voltage earlier filed in the Korean Industrial Property Office on the 21st day of February 1997, and there duly assigned Ser. No. 5239/1997, a copy of which is annexed hereto.

BACKGROUND OF THE INVENTION

1. Technical Field

The present invention relates to a switching mode power supply (SMPS) for controlling power of electronic machinery, and more particularly, to a low cost switching mode power supply that protects circuits from overvoltages and undervoltages by stopping a pulse width modulation operation.

2. Related Art

In general, an exemplary switching mode power supply (SMPS) utilizing a pulse width modulator controls power of electronic machinery by performing a line regulation on the primary side of power and a load regulation on the secondary side of power by means of a pulse width modulation controller. An example of such a switching mode power supply is disclosed in U.S. Pat. No. 5,448,469 for Switch Mode Power Supply with Output Feedback Isolation issued to Rilly et al. Generally, switching mode power supplies require a protection circuit to protect the load, or to protect components within the power supply from an overvoltage, an overcurrent, or an induced surge.

A switching mode power supply performs a line regulation by sensing the current from an output signal of a switching output part controlled by a pulse width modulation controller, performs a load regulation by detecting the voltage change induced from a coil of the largest turns ratio of the secondary loads of the power, and has the voltage of the power on the secondary side compensated in order to pass the results of the line regulation and the load regulation back to the pulse width modulation controller.

A switching mode power supply may include an alternating current (AC) input part, a rectifier part, a switching transformer, a switching output part, a pulse width modulation controller, a current sensing part, an output part, and an error detection and feedback part. The alternating current input part receives an alternating current voltage from an external source. Then the alternating current input part supplies the alternating current voltage to the rectifier part, which then outputs a direct current (DC) voltage to a load on the primary side of the switching transformer. The load in this instance is a primary coil. The switching transformer inputs the direct current voltage from the rectifier part. The switching transformer then induces different predetermined voltages to loads on the secondary side, each load having different turn ratios. The switching transformer induces the different predetermined voltages to the different loads by switching according to the control signal applied from a switching output circuit in the switching output part. The loads in this instance are coils.

The output part includes a plurality of outputs for the purpose of rectifying and smoothing voltages induced into the loads, and then outputs different predetermined voltages. Each output of the output part constitutes a rectifying diode and a smoothing capacitor for rectifying and smoothing voltages induced on the loads of the switching transformer. An error detection and feedback part detects an error of the highest voltage, induced on the load having the highest turns ratio, output from the output part, and feeds back the detected voltage errors to the pulse width modulation controller. A switching output circuit in the switching output part, which is composed of a switching element such as a field effect transistor (FET), controls on time and off time of the primary coil of the switching transformer by means of the pulse width modulation signal outputted from the pulse width modulation controller.

A current sensing part senses an output current from the switching output circuit and supplies the sensed current to the pulse width modulation controller. One example where a tertiary side coil is utilized is as follows. The pulse width modulation controller inputs at least three signals: a voltage error detected by the error detection and feedback part, the output current of the switching output circuit sensed by the current sensing part, and a voltage induced on a tertiary coil of the switching transformer. Then the pulse width modulation controller outputs pulse width modulation signals to the switching output circuit in the switching output part with a duty cycle modulated in accordance with the three signals received by the pulse width modulation controller.

The switching mode power supply senses an electric current from an output signal of a switching output part which is controlled by the pulse width modulation controller to perform the line regulation. The switching mode power supply detects a variation of voltage induced from a coil of one terminal among the loads at the secondary side of power to perform the load regulation. The results of the line regulations and load regulations are fed back to the pulse width modulation controller to thereby compensate the voltage at the secondary side of power.

Examples of power supplies utilizing pulse width modulation are disclosed in U.S. Pat. No. 5,633,787 for Switch-Mode Power Supply with Control of Output Supply Voltage and Overcurrent issued to Song, U.S. Pat. No. 5,594,631 for Digital Pulse Width Modulator for Power Supply Control issued to Katoozi et al., U.S. Pat. No. 4,876,637 for Power Converter and Method of controlling the Same issued to Mose et al., U.S. Pat. No. 4,916,569 for Short Circuit Protection for Switch Mode Power Supply issued to Konopka, U.S. Pat. No. 5,029,269 for Delayed Power Supply Overvoltage Shutdown Apparatus issued to Elliott et al., and U.S. Pat. No. 5,465,201 for Overload Protection of Switch Mode Converters issued to Cohen.

Examples of power supplies not utilizing pulse width modulation are disclosed in U.S. Pat. No. 5,124,906 for Multiple Transformer Switch Mode Power Supply issued to Kang, U.S. Pat. No. 5,216,585 for Switching Power Source Device issued to Yasumura, U.S. Pat. No. 5,657,218 for Switch Mode Power Supply Circuit issued to Rilly et al., U.S. Pat. No. 4,914,560 for Protection Circuit for Switching Mode Power Supply Circuit issued to Oh et al., U.S. Pat. No. 5,227,964 for Switching Power Supply with Overcurrent Protection Circuit issued to Furuhata, U.S. Pat. No. 5,570,277 for Switching Power Supply Apparatus issued to Ito et al., and U.S. Pat. No. 5,621,625 for Surge Protection Circuit for a Switching Mode Power Supply issued to Bang.

Currently there are some switching mode power supplies which claim to offer protection against overvoltages under certain conditions. However, I have discovered that it would be desirable to develop an enhanced low cost switching mode power supply utilizing a pulse width modulator in order to better protect against overvoltages and undervoltages.

SUMMARY OF THE INVENTION

It is an object of the present invention to provide an improved switching mode power supply which protects circuits from overvoltages and undervoltages and that substantially obviates one or more of the problems due to limitations and disadvantages of the related art.

It is an object of the present invention to provide a low cost switching mode power supply which has a function of preventing circuits from generation of an overvoltage and an undervoltage by generating a specific voltage at a third pin of a pulse width modulation controller to stop the pulse width modulation operation of the controller, when an overvoltage or undervoltage is generated in the circuits.

To accomplish these and other objects of the present invention, there is provided a switching mode power supply having a rectifying part which rectifies an alternating current applied from an alternating current input part to a direct current voltage, a switching transformer which has a primary side coil to which the direct current voltage is applied from the rectifying part and induces predetermined different voltages to a plurality of loads at secondary and tertiary sides having different turn ratios, an output part which receives the different voltages from the loads of the switching transformer and outputs different output voltages, an error detection and feedback part which receives the output voltage having a highest turn ratio among the output voltages from the output part and detects an error in the output voltage, a switching part which outputs a control signal for switching the switching transformer, a pulse width modulation controller which outputs a pulse width modulation signal, in which a duty cycle is adjusted, to the switching part in accordance with the detected error signal from the error detection and feedback part, an initial driving part for initially driving the pulse width modulation controller which rectifies an alternating current applied from the alternating current input part to a direct current voltage, and a current sensing part which is connected to a switching element of the switching part and senses the current applied to the pulse width modulation controller, including an abnormal voltage detecting part in the pulse width modulation controller for sensing whether a voltage induced through a tertiary side coil of the switching transformer is normal or abnormal, to stop the pulse width modulation operation, when it is sensed that the voltage is abnormal.

The present invention is more specifically described in the following paragraphs by reference to the drawings attached only by way of example.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
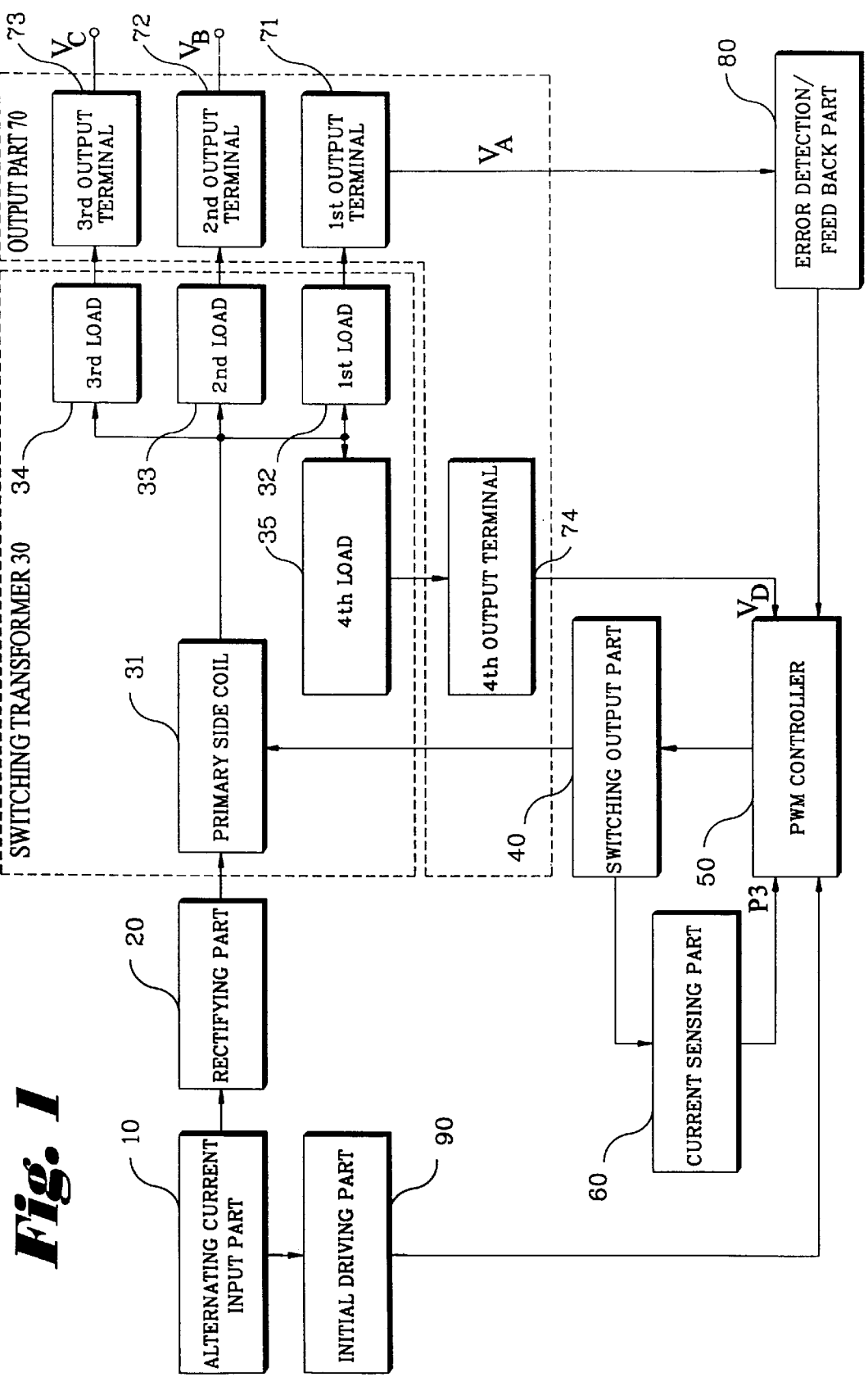
FIG. 1 is a block diagram illustrating an exemplary switching mode power supply (SMPS)

Refer to FIG. 1, which is a block diagram illustrating an exemplary switching mode power supply (SMPS). In FIG. 1, the exemplary switching mode power supply comprises an alternating current input part 10, a rectifying part 20, a switching transformer 30, a switching output part 40, a pulse width modulation (PWM) controller 50, a current sensing part 60, an output part 70, an error detection and feedback part 80 and an initial driving part 90.

In FIG. 1, the alternating current input part 10 receives an alternating current voltage from an external source and applies the received voltage to the rectifying part 20. The applied alternating current voltage is rectified to a direct current voltage and is then applied to a primary side coil 31 of the switching transformer 30 by means of the rectifying part 20. The switching transformer 30 receives the direct current voltage from the rectifying part 20. The switching transformer 30 is switched in accordance with a control signal received from the switching output part 40. The switching transformer 30 is switched to induce predetermined different voltages at coils 32, 33, 34, and 35. The coils 32, 33, and 34 are secondary side coils. The coil 35 is a tertiary side coil.

With reference to FIG. 1, the coils 32, 33, 34, and 35 have different turn ratios and correspond to loads 32, 33, 34, and 35, respectively. The output part 70 rectifies and smooths the induced voltages at the coils 32 to 35. Then the output part 70 outputs the predetermined different voltages $V_A$, $V_B$, $V_C$, and $V_D$ through a plurality of output terminals 71, 72, 73, and 74, respectively. Each of the plurality of output terminals 71 to 74 is preferably comprised of a rectifying diode and a smoothing condenser which each rectifies and smooths the induced voltages at the coils 32 to 35 of the switching transformer 30. Presuming that the voltages outputted through the output terminals 71 to 74 from the output part 70 are $V_A$, $V_B$, $V_C$, and $V_D$, the turn ratios at the secondary side coils 32 to 34 and at the tertiary side coil 35 of the switching transformer 30 can be adjusted to output each voltage in accordance with a design condition.

According to FIG. 1, the error detection and feedback part 80 receives the voltages from the output part 70 and detects an error in the voltages to feedback the detected voltage error to the pulse width modulation controller 50. The error detection and feedback part 80 detects the error in a highest voltage $V_A$ among the output voltages $V_A$, $V_B$, $V_C$, and $V_D$. Then the error detection and feedback part 80 feeds back the detected error to the pulse width modulation controller 50. The switching output part 40 is comprised of a switching element such as a field effect transistor (FET). The on time and off time of the switching output part 40 is controlled by a pulse width modulation signal outputted from the pulse width modulation controller 50. Accordingly, the switching output part 40 serves to switch an operation of the switching transformer 30 according to the pulse width modulation signal outputted from the pulse width modulation controller 50. The current sensing part 60 senses the output current of the switching output part 40 and applies the sensed current to the pulse width modulation controller 50.

With reference to FIG. 1, the pulse width modulation controller 50 receives at least three signals, as follows: the voltage error detected by the error detection and feedback part 80, the output current of the switching output part 40 sensed by the current sensing part 60, and the voltage induced at the tertiary side coil 35 of the switching transformer 30. The pulse width modulation controller 50 outputs the pulse width modulation signal, in which a duty ratio is adjusted, to the switching output part 40 in accordance with the received signals.

Regarding FIG. 1, in the exemplary switching mode power supply having the above construction, the pulse width modulation controller 50 adjusts the power at the primary side of the switching transformer 30 based upon the output current of the switching output part 40 sensed by the current sensing part 60 and also adjusts the power at the secondary side loads of the switching transformer 30 based upon the voltage error in any one coil among the secondary side coils detected by the error detection and feedback part 80. The initial driving part 90 rectifies an initial alternating current input voltage and supplies the rectified voltage as a driving voltage for an initial driving of the pulse width modulation controller 50.

Figure 2:
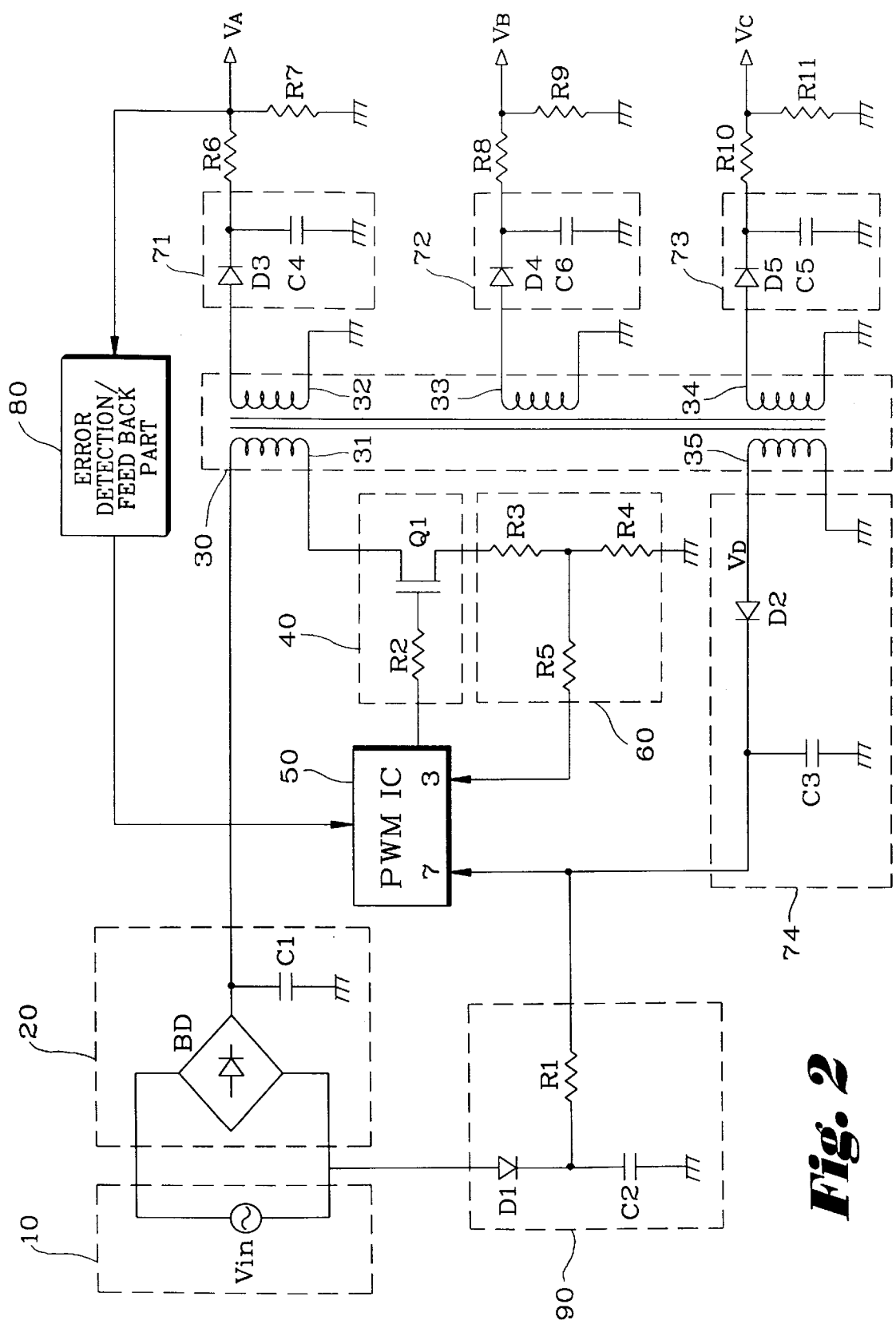
FIG. 2 is a circuit diagram illustrating details of the switching mode power supply of FIG.

Refer now to FIG. 2, which is a circuit diagram illustrating details of the switching mode power supply of FIG. 1. In FIG. 1, the rectifying part 20 is comprised of a bridge rectifier BD which rectifies an alternating current input voltage V$_{IN}$ inputted to two alternating current input terminals and a smoothing capacitor C1 which is connected to an output terminal of the bridge rectifier BD and smooths the rectified voltage.

In FIG. 2, a first end of the primary side coil 31 of the switching transformer 30 is connected to the smoothing capacitor C1 of the rectifying part 20. The output terminals 71, 72, and 73, which each include a rectifying diode and a smoothing capacitor, are respectively connected to the first, second, and third loads 32, 33, and 34 of the secondary side coils of the switching transformer 30. The switching element is the field effect transistor Q1. A drain terminal of a field effect transistor Q1 is connected to a second end of the primary side coil of the switching transformer 30. The switching signal of the pulse width modulation controller is provided via a resistor R2 to the gate terminal of the transistor Q1.

With reference to FIG. 2, the current sensing part 60 is connected to the source terminal of transistor Q1, to a third pin of the pulse width modulation controller 50, and to a reference potential. The current sensing part 60 senses the current at the source terminal of transistor Q1. Then the current sensing part 60 outputs a voltage to a third pin of the pulse width modulation controller 50. The current sensing part 60 includes three resistors labeled as R3, R4, and R5. The current sensing part 60 outputs the voltage detected by a resistor that is connected to a source terminal of the transistor Q1, through a resistor R5 to a third pin of the pulse width modulation controller 50, to thereby sense the current. The predetermined voltage induced from the primary side to the tertiary side of the switching transformer 30 is rectified and smoothed through a rectifying diode D2 and a smoothing capacitor C3 and is provided as a power supply voltage V$_{CC}$ to a seventh pin of the pulse width modulation controller 50. The aforementioned third pin of the pulse width modulation controller 50 in FIG. 2 corresponds to P3 in FIG. 1.

In FIG. 2, there are potential problems. For example, if the circuits at the secondary side or at the tertiary side are short circuited and an overvoltage is thus generated, electronic components could be damaged and a dangerous fire could be caused.

With reference to FIG. 2, in the case where a voltage at a third pin of the pulse width modulation controller 50 is within the anticipated design conditions in the exemplary switching mode power supply, the pulse width modulation controller 50 outputs the pulse width modulation signal having a minimum duty cycle to the switching output part 40. Thus, the switching output part 40 serves to switch the operation of the switching transformer 30 in accordance with the pulse width modulation signal, to thereby limit the generation of overvoltage.

Regarding FIG. 2, one serious problem can be described using the following example. Initially, a circuit corresponding to the coil on the tertiary side is short circuited and, accordingly, an overvoltage is generated. This overvoltage is detected by an error detector of the switching transformer 30. Note that this error detector of the switching transformer 30 is not the error detection and feedback part 80. In response to the detected overvoltage condition, a pulse width modulation signal having a minimum duty cycle is outputted from the pulse width modulation controller 50 to the switching output part 40 to induce decreased voltages to thereby eliminate the overvoltage condition. Next, since the switching output part 40 is now being operated by a pulse width modulation signal having a minimum duty cycle, an undervoltage condition in a coil on the secondary side is detected by the error detection and feedback part 80. The detected undervoltage error is supplied to the pulse width modulation controller 50 by the error detection and feedback part 80. Thereafter, the pulse width modulation controller 50 outputs a pulse width modulation signal having a duty cycle sufficient to induce increased voltages to eliminate the new undervoltage condition detected by the error detection and feedback part 80. The duty cycle sufficient to induce increased voltages is above the minimum duty cycle and shall be called the sufficient duty cycle. Accordingly, the switching output part 40 controls the operation of the switching transformer 30 by the pulse width modulation signal having the so-called sufficient duty cycle. Unfortunately, a problem occurs. The problem occurs because the pulse width modulation controller 50 outputs the pulse width modulation signal having the sufficient duty cycle to induce increased voltages to the switching output part 40 because of the undervoltage error condition detected by the error detection and feedback part 80. Thus, current flows through the coils even during an overvoltage, as described above, and the switching transformer 30 operates in a normal state. Therefore, electronic components can be damaged and a fire can be started.

With reference to FIG. 2, another problem with the exemplary switching mode power supply can be described as follows. In the case where the circuit of the error detection and feedback part 80 is damaged and the detected voltage error is not supplied to the pulse width modulation controller 50, the current to the coils of all terminals of the secondary side drastically increases, to finally damage all of the circuits.

Figure 3:
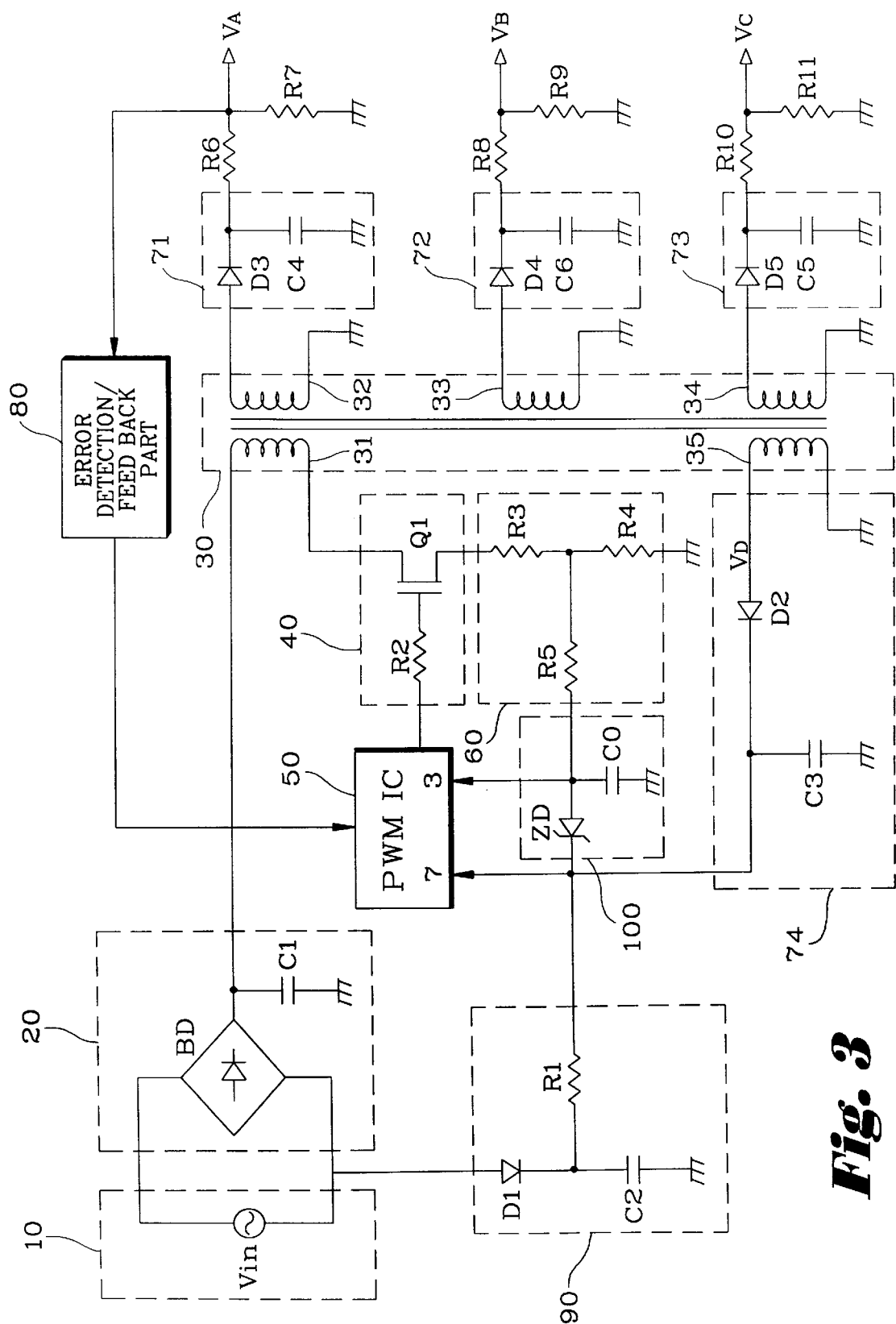
FIG. 3 is a circuit diagram illustrating a switching mode power supply according to the principles of the present invention.

Refer now to FIG. 3, which is a circuit diagram illustrating a switching mode power supply according to the principles of the present invention. A switching mode power supply constructed according to the principles of the present invention prevents damage to circuits by continuously stopping the operation of a pulse width modulation controller when an overvoltage or undervoltage is detected.

In FIG. 3, a switching mode power supply is illustrated having an alternating current input part 10, a rectifying part 20, a switching transformer 30, a switching output part 40, a pulse width modulation controller 50, a current sensing part 60, an output part 70, an error detection and feedback part 80 and an initial driving part 90. The exemplary switching mode power supply of FIG. 2 is also comprised of those components. However, the switching mode power supply of FIG. 3 includes an abnormal voltage detecting part 100 in the pulse width modulation controller 50. The exemplary switching mode power supply of FIG. 2 does not include an abnormal voltage detecting part 100.

With reference to FIG. 3, the abnormal voltage detecting part 100 continuously stops the operation of the pulse width modulation controller 50 when a voltage induced through a tertiary side coil of the switching transformer 30 is abnormal. Therefore, the continuous shutdown of switching transformer 30 results in protection of the circuits against an overvoltage or undervoltage. The abnormal voltage detecting part 100 is disposed among a fourth output terminal 74 of the switching transformer 30, the pulse width modulation controller 50 and the current sensing part 60. The voltage induced from the tertiary side coil 35 of the switching transformer 30 is applied via a diode D2 and a capacitor C3 to a seventh pin of the pulse width modulation controller 50. Note that the abnormal voltage detecting part 100 can be located can be located within the pulse width modulation controller 50, within the current sensing part 60, within the fourth output terminal 74, or within other adjacent components. Alternatively, the abnormal voltage detecting part 100 can be a separate individual part which is not located within any other part. The current sensing part 60 includes three resistors labeled as R3, R4, and R5. The current sensing part 60 outputs the voltage detected by a resistor that is connected to a source terminal of the switching transistor Q1, through a resistor R5 to a third pin of the pulse width modulation controller 50, to thereby sense the current.

Turn now to FIGS. 1, 2, and 3. The operation of the components comprising the exemplary switching mode power supply, as shown in FIGS. 1 and 2, is substantially the same as the operation of the corresponding components comprising the switching mode power supply according to the principles of the present invention, as shown in FIG. 3. Importantly, the abnormal voltage detecting part 100 of FIG. 3 has no corresponding component in either FIG. 1 or FIG. 2.

In FIG. 3, the abnormal voltage detecting part 100 is disposed between the seventh pin and the third pin of the pulse width modulation controller 50. The abnormal voltage detecting part 100 is comprised of a zener diode ZD and a capacitor CO. The zener diode ZD is turned on if the rectified voltage by the diode D2 is over a specific voltage. The capacitor CO smooths the voltage applied through the zener diode ZD.

According to FIG. 3, an alternating current applied from the alternating current input part 10 is rectified to a direct current voltage and is then applied to a primary side coil 31 of the switching transformer 30 by means of the rectifying part 20, to thereby induce predetermined different voltages at secondary side coils 32 to 34 and at a tertiary side coil 35 having different turn ratios, as a plurality of loads 32 to 35, respectively.

In FIG. 3, the error detection and feedback part 80 detects an error in the voltage of any one terminal $V_A$ among the output voltages $V_A$, $V_B$, $V_C$ and $V_D$ outputted from the output part 70 and feeds back the detected voltage error to the pulse width modulation controller 50. Then the current sensing part 60 senses the output current of the switching output part 40 and applies the sensed current to the pulse width modulation controller 50. Accordingly, in the case where an overvoltage is not detected in the abnormal voltage detecting part 100, the pulse width modulation controller 50 receives at least three signals, as follows: the output current of the switching output part 40 sensed by the current sensing part 60, the detected voltage error by the error detection and feedback part 80, and the voltage at the fourth load 35 of the switching transformer 30. The pulse width modulation controller 50 outputs the pulse width modulation signal in which a duty ratio is adjusted to the switching output part 40 in accordance with these received signals. The switching output part 40 inputs the pulse width modulation signal from the pulse width modulation controller 50 and serves to switch the primary side of the switching transformer 30, to thereby stabilize the output voltage at the secondary side.

With reference to FIG. 3, in the case where an overvoltage at the fourth load 35 of the switching transformer 30 is detected by the abnormal voltage detecting part 100, the pulse width modulation controller 50 is stopped by the abnormal voltage detecting part 100. As a result, the pulse width modulation controller 50 is shut down by the abnormal voltage detecting part 100 unceasingly. Therefore, the switching operation of the switching transformer 30 is continually stopped to protect the circuit from the overvoltage generated. The zener diode ZD maintains a turn-off state in a normal state, but if an abnormal voltage occurs due to an abnormal operation an important voltage level changes. In other words, when the overvoltage at the fourth load 35 exceeds a specific voltage, the zener diode ZD is turned on. At that time, since the voltage on the third pin of the pulse width modulation controller 50 is high, that is, over about 1V, a protection state becomes changed. In other words, the pulse width modulation is outputted at a minimum duty, and therefore, the pulse width modulation controller 50 stops. At that time, the switching mode power supply is in a minimum voltage state and prevents the circuit damage caused due to the generation of abnormal voltage.

Figure 4:
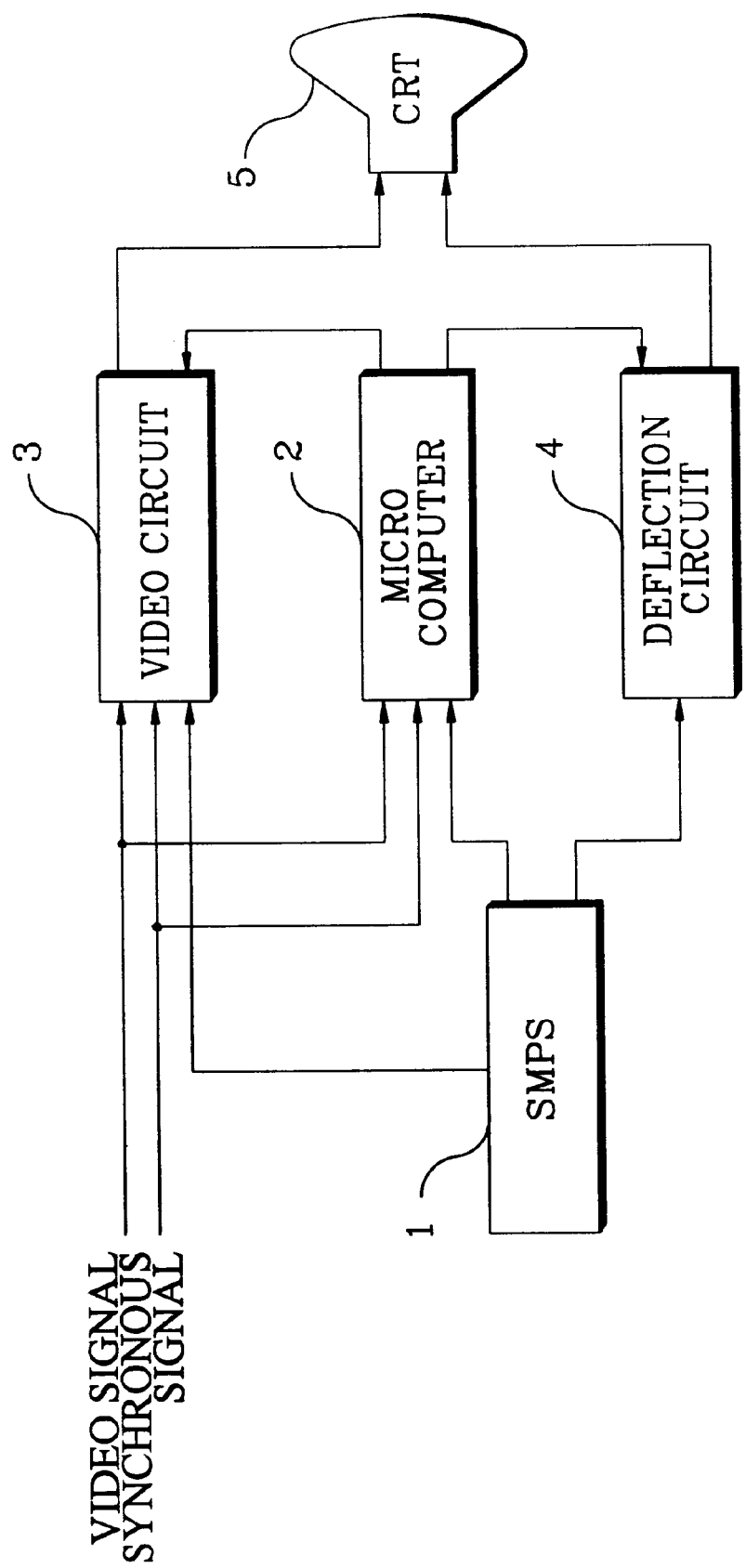
FIG. 4 is a block diagram illustrating a switching mode power supply according to the principles of the present invention, in conjunction with a display device.

Refer now to FIG. 4, which is a block diagram illustrating a switching mode power supply according to the principles of the present invention, in conjunction with a display device. The display device includes a video circuit 3 which inputs vertical and horizontal synchronous signals and a video signal, a deflection circuit 4 which performs a deflection operation for an electronic beam in vertical and horizontal directions, a microcomputer 2 which controls the video circuit 3 and the deflection circuit 4, a cathode ray tube (CRT) 5 which displays the video signal outputted from the video circuit 3 with the output of the deflection circuit 4, and a switching mode power supply 1 which applies a predetermined voltage to the video circuit 3, the deflection circuit 4, and the microcomputer 2.

In FIG. 4, output voltages are outputted from the switching mode power supply 1 and are applied to the microcomputer 2, the video circuit 3, and the deflection circuit 4. The microcomputer 2 controls the video circuit 3 and the deflection circuit 4 to display a video signal by means of the cathode ray tube 5, according to a display mode. Display modes include normal state, stand-by state, temporary stop state, and off-state.

With reference to FIGS. 1 and 4, assume that the switching mode power supply 1 according to the principles of the present invention shown in FIG. 4, is removed from the arrangement displayed in FIG. 4 and replaced by the exemplary switching mode power supply of FIG. 1. While using the exemplary switching mode power supply of FIG. 1 in this manner, overcurrents or overvoltages can be generated and can cause damage to circuits when an abnormal state such as the disconnection or short circuit of the loads occurs. However, when the switching mode power supply 1 according to the principles of the present invention is used in the arrangement shown in FIG. 4, the supply of power is stopped and prevents damage to circuits when an abnormal state such as the disconnection or short circuit of the loads occurs.

As is clearly apparent from the foregoing, a switching mode power supply constructed according to the principles of the present invention can effectively protect against circuit damage when an abnormal state such as the disconnection or short circuit of the load or loads occurs.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A switching mode power supply that protects against overvoltages and undervoltages, comprising:

an alternating current unit outputting alternating current voltage;

a rectifying unit rectifying alternating current voltage received from said alternating current unit and outputting direct current voltage;

a switching transformer receiving direct current voltage from said rectifying unit to a primary side coil, and inducing respective different predetermined voltages in a plurality of secondary side coils and a tertiary side coil having respective different turns ratios;

an output unit receiving said respective different predetermined voltages induced in said plurality of secondary coils and said tertiary side coil, rectifying said respective different predetermined voltages, and outputting respective different rectified voltages;

an error detection and feedback unit receiving a first voltage signal of said respective different rectified voltages, said first voltage signal being of a coil having a highest turns ratio among said plurality of secondary coils, detecting an error in said first voltage signal, and outputting an error signal;

a switching output unit outputting a control signal to said switching transformer to switch said switching transformer;

a current sensing unit sensing a first current signal outputted from said switching output unit and outputting a second current signal corresponding to said first current signal;

a pulse width modulator receiving said error signal, said second current signal, and a voltage signal of said tertiary side coil, and outputting a pulse width modulation signal having a duty cycle modulated according to said received signals to said switching output unit;

an initial driving unit rectifying alternating current voltage received from said alternating current unit and outputting direct current voltage to said pulse width modulator for initially diriving said pulse width modulator; and an abnormal voltage detecting unit detecting when an overvoltage from said tertiary side coil occurs, stopping an operation of said pulse width modulator when said overvoltage is detected, receiving said voltage signal of said tertiary side coil, said second direct current voltage, and said second current signal.

2. The switching mode power supply of claim 1, wherein said abnormal voltage detecting unit comprises a zener diode turned on and turned off according to said voltage signal of said tertiary side coil having an anode connected to a third pin of said pulse width modulator and a cathode connected to said tertiary side coil, and a capacitor disposed between a reference potential and said anode of said zener diode.

3. The switching mode power supply of claim 1, wherein said rectifying unit comprises a bridge rectifier having a first and second input terminal receiving alternating current voltage and a first and second output terminal outputting direct current voltage, and a smoothing capacitor disposed between said first output terminal and a reference potential.

4. The switching mode power supply of claim 1, wherein said abnormal voltage detecting unit is located within said pulse width modulator.

5. The switching mode power supply of claim 1, wherein said initial driving unit comprises:

a diode having an anode receiving alternating current voltage and a cathode;

a capacitor disposed between said cathode of said diode and a reference potential; and a resistor having a first terminal connected to said cathode of said diode and a second terminal outputting direct current voltage.

6. The switching mode power supply of claim 1, wherein said switching output unit comprises a transistor having a control electrode connected to said pulse width modulator, a first electrode of a principal electrically conducting channel connected to said primary side coil, and a second electrode of said principal electrically conducting channel connected to said current sensing unit.

7. The switching mode power supply of claim 6, wherein said transistor corresponds to a field effect transistor having a gate terminal, a drain terminal, and a source terminal.

8. The switching mode power supply of claim 7, wherein said gate terminal corresponds to said control electrode, said drain terminal corresponds to said first electrode of said principal electrically conducting channel, and said source terminal corresponds to said second electrode of said principal electrically conducting channel.

9. The switching mode power supply of claim 1, wherein said error signal corresponds to one of an overvoltage and an undervoltage.

10. A switching mode power supply that protects against overvoltages and undervoltages, comprising:

an alternating current unit outputting alternating current voltage;

a bridge rectifier having first and second input terminals receiving alternating current voltage from said alternating current unit, and first and second output terminals outputting rectified direct current voltage;

a first capacitor disposed between said first output terminal of said bridge rectifier and a reference potential;

a first diode having an anode connected to said second output terminal of said bridge rectifier, and a cathode;

a second capacitor disposed between said cathode of said first diode and said reference potential;

a first resistor having a first terminal connected to said cathode of said first diode, and a second terminal;

a zener diode having a cathode connected to said second terminal of said first resistor, and an anode;

a third capacitor disposed between said anode of said zener diode and said reference potential;

a pulse width modulator having a third pin, a seventh pin, an input terminal and an output terminal, said third pin connected to said anode of said zener diode and said seventh pin connected to said cathode of said zener diode;

a switching transformer having a primary side coil, a first, second, and third secondary side coil, and a tertiary side coil, each of said coils having a first and second terminal, said first terminal of said primary side coil connected to said first output terminal of said bridge rectifier, said second terminals of said tertiary side coil and said secondary side coils connected to said reference potential;

a second resistor having a first terminal connected to said output terminal of said pulse width modulator, and a second terminal;

a third resistor having a first terminal connected to said anode of said zener diode, and a second terminal;

a fourth resistor having a first terminal connected to said second terminal of said third resistor and a second terminal connected to said reference potential;

a fifth resistor having a first terminal connected to said first terminal of said fourth resistor, and a second terminal;

a transistor having a control electrode connected to said second terminal of said second resistor, a first electrode of a principal electrically conducting channel connected to said second terminal of said primary side coil, and a second electrode of said principal electrically conducting channel connected to said second terminal of said fifth resistor;

a second diode having an anode connected to said first terminal of said first secondary side coil, and a cathode;

a fourth capacitor disposed between said cathode of said second diode and said reference potential;

a sixth resistor having a first terminal connected to said cathode of said second diode, and a second terminal;

an error detection and feedback unit having an input terminal connected to said second terminal of said sixth resistor and an output terminal connected to said input terminal of said pulse width modulator;

a seventh resistor disposed between said second terminal of said sixth resistor and said reference potential;

a third diode having an anode connected to said first terminal of said second secondary side coil, and a cathode;

a fifth capacitor disposed between said cathode of said third diode and said reference potential;

an eighth resistor having a first terminal connected to said cathode of said third diode, and a second terminal;

a ninth resistor disposed between said second terminal of said eighth resistor and said reference potential;

a fourth diode having an anode connected to said first terminal of said third secondary side coil, and a cathode;

a sixth capacitor disposed between said cathode of said fourth diode and said reference potential;

a tenth resistor having a first terminal connected to said cathode of said fourth diode, and a second terminal;

an eleventh resistor disposed between said second terminal of said tenth resistor and said reference potential;

a fifth diode having an anode connected to said first terminal of said tertiary side coil, and a cathode connected to said seventh pin of said pulse width modulator; and a seventh capacitor disposed between said cathode of said fifth diode and said reference potential.

11. The switching mode power supply of claim 10, wherein said transistor corresponds to a field effect transistor having a gate terminal, a drain terminal, and a source terminal.

12. The switching mode power supply of claim 11, wherein said gate terminal corresponds to said control electrode, said drain terminal corresponds to said first electrode of said principal electrically conducting channel, and said source terminal corresponds to said second electrode of said principal electrically conducting channel.

13. A display apparatus inhibiting overvoltages and undervoltages, comprising:

a video circuit receiving a first video signal, a vertical synchronization signal, and a horizontal synchronization signal, and outputting a second video signal;

a microcomputer receiving said first video signal, said vertical synchronization signal, and said horizontal synchronization signal, and outputting a video control signal to said video circuit for controlling said video circuit, and outputting a deflection control signal;

a deflection circuit deflecting an electrical beam to a vertical and horizontal direction, receiving said deflection control signal controlling direction of said electrical beam, and outputting a deflection signal;

a video display receiving said second video signal and said deflection signal, conveying varying visual information to a user corresponding to said second video signal in accordance with said deflection signal;

a switching mode power supply receiving alternating current voltage, rectifying alternating current voltage received, and outputting direct current voltage;

a switching transformer receiving direct current voltage from said switching mode power supply to a primary side coil, and inducing respective different predetermined voltages in a plurality of secondary side coils and a tertiary side coil having respective different turns ratios;

an output unit receiving said respective different predetermined voltages induced in said plurality of secondary coils and said tertiary side coil, rectifying said respective different predetermined voltages, and outputting respective different rectified voltages to said video circuit, said microcomputer, and said deflection circuit;

an error detection and feedback unit receiving a first voltage signal of said respective different rectified voltages, said first voltage signal being of a coil having a highest turns ratio among said plurality of secondary coils, detecting an error in said first voltage signal, and outputting an error signal;

a switching output unit outputting a control signal to said switching transformer to switch said switching transformer;

a current sensing unit sensing a first current signal outputted from said switching output unit and outputting a second current signal corresponding to said first current signal;

a pulse width modulator receiving said error signal, said second current signal, and a voltage signal of said tertiary side coil, and outputting a pulse width modulation signal having a duty cycle modulated according to said received signals to said switching output unit;

an initial driving unit rectifying alternating current voltage and outputting direct current voltage to said pulse width modulator for initially driving said pulse width modulator; and an abnormal voltage detecting unit detecting when an overvoltage from said tertiary side coil occurs, stopping an operation of said pulse width modulator when said overvoltage is detected, and receiving said voltage signal of said tertiary side coil, said second current signal outputted from said current sensing unit, and direct current voltage outputted from said initial driving unit.

14. The display apparatus of claim 13, wherein said visual display corresponds to a cathode ray tube.

15. The display apparatus of claim 13, wherein said visual display corresponds to a liquid crystal display.

16. The display apparatus of claim 13, wherein said abnormal voltage detecting unit comprises a zener diode turned on and turned off according to said voltage signal of said tertiary side coil having an anode connected to a third pin of said pulse width modulator and a cathode connected to said tertiary side coil, and a capacitor disposed between a reference potential and said anode of said zener diode.

17. The display apparatus of claim 13, wherein said abnormal voltage detecting unit is located within said pulse width modulator.

18. The display apparatus of claim 13, wherein said error signal corresponds to one of an overvoltage and an undervoltage.

19. The display apparatus of claim 13, wherein said initial driving unit comprises:

a diode having an anode receiving alternating current voltage and a cathode;

a capacitor disposed between said cathode of said diode and a reference potential; and a resistor having a first terminal connected to said cathode of said diode and a second terminal outputting direct current voltage.

20. The display apparatus of claim 13, wherein said switching output unit comprises a transistor having a control electrode connected to said pulse width modulator, a first electrode of a principal electrically conducting channel connected to said primary side coil, and a second electrode of said principal electrically conducting channel connected to said current sensing unit.

* * * * *